United States Patent [19]

Elmer et al.

[11] Patent Number: 4,597,132
[45] Date of Patent: Jul. 1, 1986

[54] BAND SAW FOR CUTTING CARCASSES OR THE LIKE

[75] Inventors: Stefan Elmer, Oetisheim; Erich Forberger, Maulbronn, both of Fed. Rep. of Germany

[73] Assignee: Schmid & Wezel, Maulbronn, Fed. Rep. of Germany

[21] Appl. No.: 613,960

[22] Filed: May 24, 1984

[30] Foreign Application Priority Data

May 30, 1983 [DE] Fed. Rep. of Germany ....... 3319623

[51] Int. Cl.⁴ .......................... A22B 5/20; B27B 13/10
[52] U.S. Cl. ......................................... 17/23; 83/819; 83/814
[58] Field of Search ................. 83/661, 814, 818, 819, 83/820; 17/23

[56] References Cited

U.S. PATENT DOCUMENTS 4,327,621 5/1982 Voorhees et al. ................... 83/820

FOREIGN PATENT DOCUMENTS 751826 7/1933 France ................................. 83/818

Primary Examiner—Willie G. Abercrombie
Attorney, Agent, or Firm—Peter K. Kontler

[57] ABSTRACT

A band saw wherein one of the pulleys for an endless band-like blade is movable toward and away from the other pulley to relax the tension upon or to tension the blade. The one pulley is permanently biased away from the other pulley by a relatively weak spring whose bias can be overcome by hand to facilitate the removal of a blade or the application of a fresh blade. In addition, the one pulley is normally biased away from the other pulley with a pronounced force by a package of dished springs whose bias upon the one pulley can be interrupted by a single-acting cylinder and piston unit whose piston is installed between the dished springs and a reciprocable carriage for the one pulley. The dished springs react against a support for the pulleys and bear against the piston. Two twisting units are provided to maintain a central portion of one of the two elongated reaches of the blade in a plane which is normal to the axes of the pulleys, and such twisting units can be pivoted or otherwise moved into and from engagement with the one reach by fluid-operated motors.

30 Claims, 11 Drawing Figures

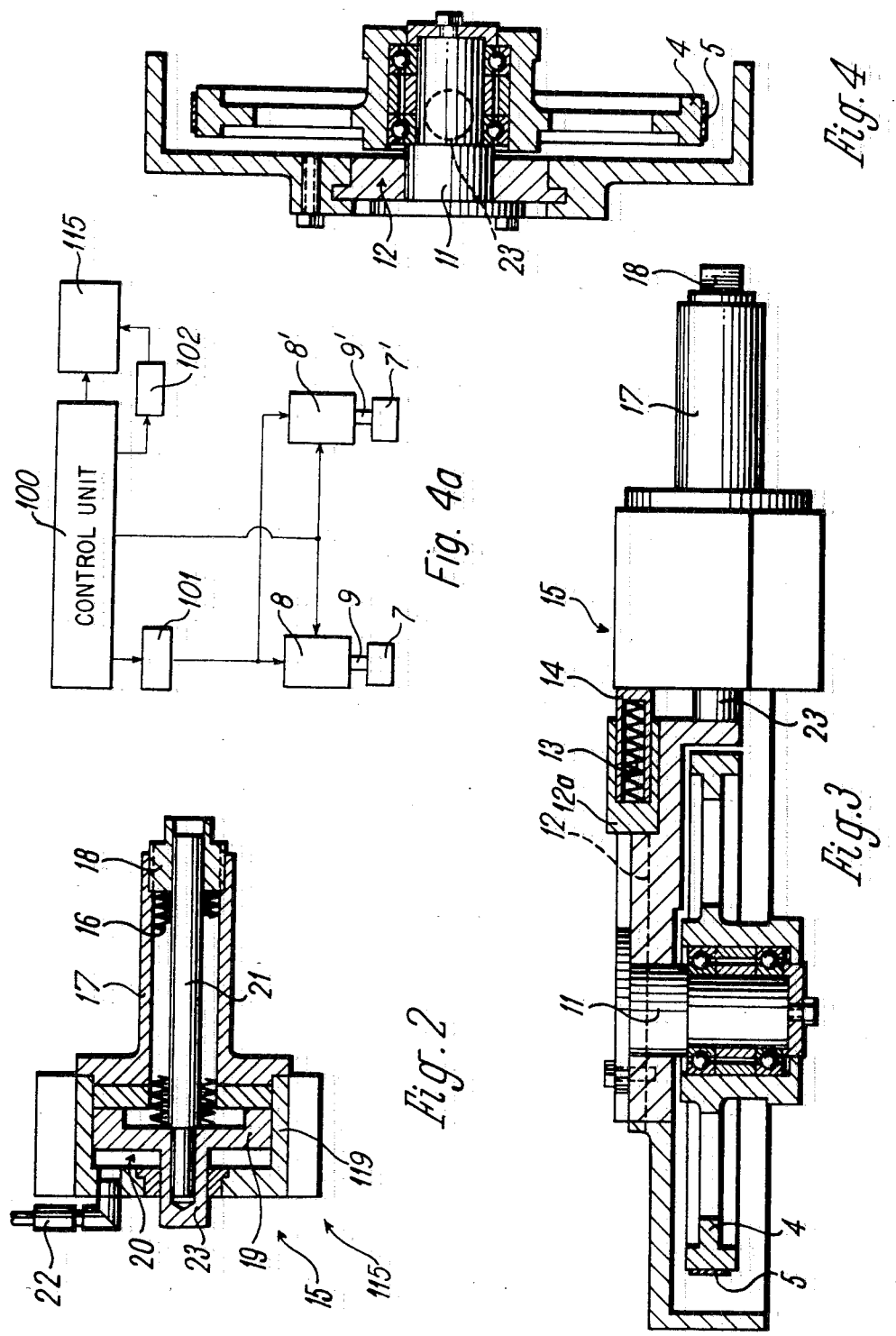

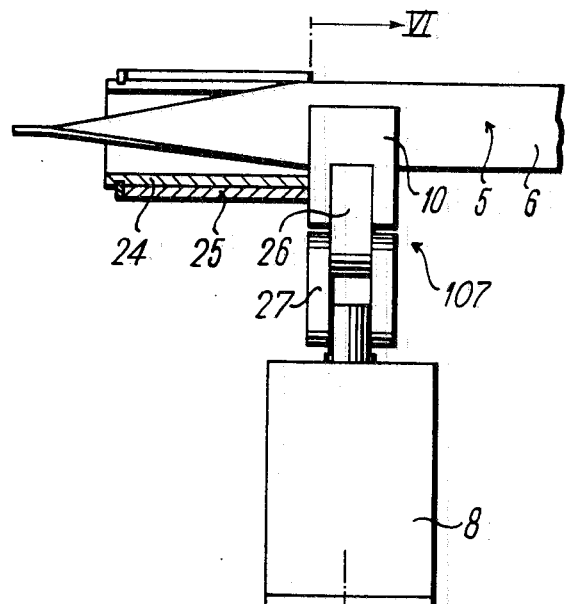
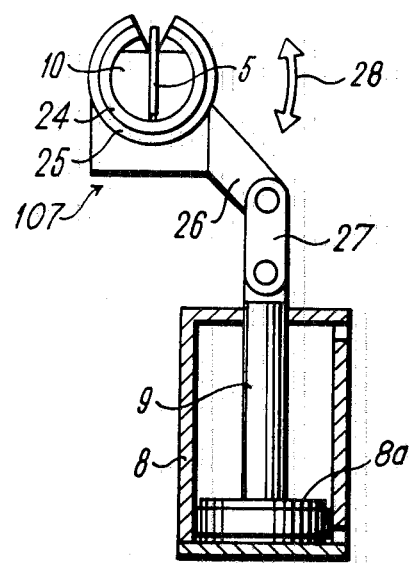
Fig.5
Fig.6
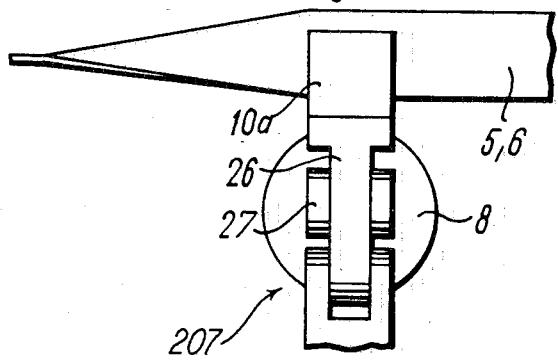
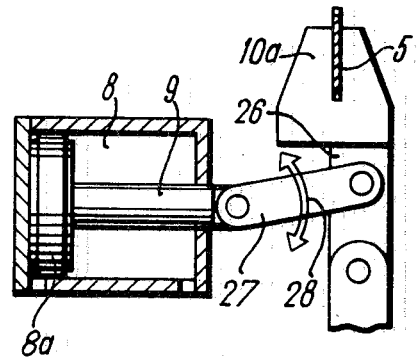
Fig.7
Fig.8
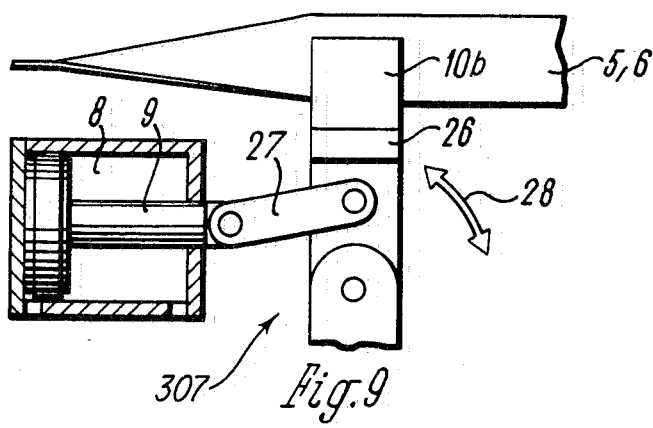
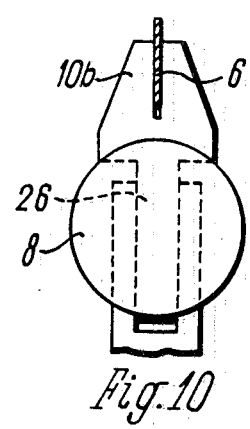
Fig.9
Fig.10

BAND SAW FOR CUTTING CARCASSES OR THE LIKE

BACKGROUND OF THE INVENTION

The present invention relates to band saws in general, and more particularly to improvements in band saws which can be utilized with advantage for cutting carcasses or the like. Still more particularly, the invention relates to improvements in band saws of the type wherein an endless band-like blade is trained over several pulleys, wherein at least one of the pulleys is movable toward and away from the other pulley or pulleys to thereby relax the tension upon or to tension the blade, and wherein a portion of one reach of the blade is twisted so that it is located in a plane which is at least substantially normal to the axes of the pulleys.

A band saw of the above outlined character is disclosed in German Offenlegungsschrift No. 31 23 439. The band saw which is disclosed in this publication lacks suitable means for facilitating rapid and convenient replacement of a worn or damaged blade with a fresh blade. Since the useful life of the blade is rather short, such replacement must be carried out at frequent intervals and, in the absence of any means for permitting rapid, effortless and convenient replacement of a spent or damaged blade with a fresh blade, the intervals of idleness of the band saw are rather long which is especially undesirable when the implement is used in a production line wherein each stoppage of the band saw entails an interruption of operation of the entire line. One of the reasons why the replacement of a spent or damaged blade with a fresh blade takes up a rather long interval of time is because the blade must be tensioned when in actual use and the tension upon the blade must be relaxed or reduced to zero before the blade can be slipped off the pulleys.

OBJECTS AND SUMMARY OF THE INVENTION

An object of the invention is to provide a novel and improved band saw wherein the blade can be removed and a fresh blade installed within a fraction of the time which is required for such operations in a conventional implement.

Another object of the invention is to provide a band saw wherein the blade can be rapidly installed or from which the blade can be rapidly removed even if the blade is maintained under pronounced or very pronounced tension when the implement is in actual use.

A further object of the invention is to provide novel and improved means for tensioning the blade in a band saw.

An additional object of the invention is to provide the band saw with novel and improved tensioning means which not only allows for rapid and convenient removal or installation of a blade but also permits for regulation of the tension upon the inserted blade within a desired range.

Still another object of the invention is to provide the band saw with novel and improved means for twisting or changing the orientation of a portion of the inserted blade.

A further object of the invention is to provide a novel and improved control system which can initiate various operations in the improved band saw in an optimum sequence and at optimum intervals.

Another object of the invention is to provide a novel and improved method of installing a blade in and removing a blade from a band saw.

An additional object of the invention is to provide the band saw with novel and improved means for permitting stepwise reduction of tension upon a blade which is about to be removed from the implement.

A further object of the invention is to provide a band saw which can be installed in existing production lines in slaughterhouses or like plants as a superior substitute for heretofore used band saws.

The invention is embodied in a band saw, particularly in a band saw which can be used for cutting carcasses in an automated slaughterhouse. The improved band saw comprises a support or frame, a plurality of pulleys which are carried by the support and are rotatable about parallel axes, means for driving one of the pulleys, and an endless band-like flexible blade which is trained over the pulleys. At least one of the pulleys is movable relative to another of the pulleys so as to tension or relax the tensional stress upon the blade, and the band saw further comprises means for tensioning the blade including first biasing means which is activatable to react against the support and to act upon the one pulley with a first force in a direction to increase its distance from the other pulley and to thereby tension the blade, and second biasing means which is also activatable to react against the support and then acts upon the one pulley with a second force greater than the first force and also tending to move the one pulley away from the other pulley, i.e., to increase the tensional stress upon the blade. At least one of the two biasing means can comprise one or more springs.

The improved band saw further comprises operating means for selectively activating and deactivating at least one of the biasing means (preferably but not necessarily the second biasing means) so as to facilitate the training of the blade around and its separation from the pulleys in deactivated condition of the one biasing means. The operating means can comprise a fluid-operated motor which is disposed in series with the one biasing means between the support and the one pulley and has a member (e.g., a flat piston) movable between first and second positions to thereby respectively activate and deactivate the one biasing means. The one biasing means can include at least one resilient element (e.g., one or more packages of dished springs) which is arranged to store energy in response to movement of the aforementioned member from one to the other of its positions. Adjusting means can be provided to vary the bias of the first and/or second biasing means independently of the operating means. For example, the first biasing means can be designed to act upon the one pulley with a force of approximately 2.5 kp and the second biasing means (namely, the biasing means which is preferably associated with the operating means) can be designed to act upon the one pulley with a force of between approximately 250 and 300 kp. The cylinder of the motor which forms part of or constitutes the operating means for the one biasing means can constitute a single-acting cylinder which defines a plenum chamber. The aforementioned member of the operating means is then a piston which is reciprocable in the cylinder and is adjacent to the chamber. The resilient element or elements of the one biasing means preferably abut against that side of the piston which faces away from the plenum chamber, and such piston can be provided with a piston rod which extends through the plenum chamber, through and from the cylinder, and into direct or indirect engagement with the one pulley when the plenum chamber is evacuated so that the resilient element or elements of the one biasing means can act upon and can move the piston relative to the cylinder. The piston can be provided with guide means in the form of a rod which can extend axially through the package of dished springs and is reciprocably guided in the means for adjusting the bias of the dished springs independently of the operating means. The operating means and the one biasing means can be installed in a common housing which is preferably separably secured to the support.

The blade includes an elongated reach which extends between the one pulley and the other pulley, and the band saw preferably further comprises means for twisting a portion of the reach. Such twisting means is preferably designed to twist a portion of the reach into a plane which is normal to the axes of the pulleys, and the teeth or analogous projections of the thus twisted portion serve to cut a carcass or the like when the band saw is in actual use. Still further, the band saw can comprise displacing means for moving the twisting means relative to the support, e.g., into and from engagement with the reach of the blade. Such displacing means can comprise fluid-operated motor means. The band saw can further comprise suitable control means or programming means for deactivating the one biasing means by way of the operating means in a first step and for thereupon actuating the displacing means with a predetermined delay to disengage the twisting means from the blade or to prepare the twisting means for separation from the blade prior to detachment of the blade from the pulleys. When a fresh blade has been trained over the pulleys, the control means first actuates the displacing means to engage the twisting means with the blade and thereupon activates the one biasing means by way of the operating means with a predetermined delay.

The twisting means can comprise at least one chuck for a portion of the reach of the blade and means for turning the chuck back and forth through an angle of approximately or exactly 90°. Such chuck can comprise an elongated slotted tubular element whose axis is parallel to the reach of the blade and which is turnable about such axis by the aforementioned turning means. The chuck can be constructed and mounted in such a way that it must be turned about an axis which is normal to the reach of the blade; such chuck can be connected with a reciprocable piston rod of the turning means by way of an arm which is rigidly attached thereto or made integral therewith and a link which is articulately connected to the arm and to the piston rod. The piston rod can be reciprocated at right angles to or in parallelism with the reach of the blade.

Alternatively, the chuck can constitute or include tongs having two jaws at least one of which is movable toward and away from the other jaw to thereby engage or release a portion of a blade therebetween, and the tongs can be pivoted back and forth about a fixed axis to thereby twist or untwist the blade. Alternatively, the movement of one jaw toward the other jaw can automatically entail requisite twisting of the blade portion between the two jaws. Such jaws can be provided with mating teeth.

As a rule, the twisting means will comprise two discrete twisting units each of which is movable by discrete displacing means and which are spaced apart from one another, as considered in the longitudinal direction of the aforementioned reach.

The novel features which are considered as characteristic of the invention are set forth in particular in the appended claims. The improved band saw itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is an enlarged fragmentary sectional view as seen in the direction of arrows from the line II—II of FIG. 1, showing the one biasing means and the operating means therefor;

FIG. 3 is an enlarged fragmentary sectional view as seen in the direction of arrows from the line III—III of FIG. 1, showing the other biasing means and the manner of mounting the movable pulley for the blade;

FIG. 4 is an enlarged axial sectional view of the movable pulley as seen in the direction of arrows from the line IV—IV of FIG. 1;

FIG. 4a is a diagrammatic view of a control unit which can be used in or with the band saw of FIGS. 1 to 4;

FIG. 5 is an elevational view of one of two modified twisting devices for a portion of the saw blade;

FIG. 6 is a sectional view of the one twisting device as seen in the direction of arrows from the line VI—VI of FIG. 5;

FIG. 7 is an elevational view of one of two different twisting devices;

FIG. 8 is a sectional view as seen in the direction of arrows from the line VIII—VIII of FIG. 7;

FIG. 9 is a partly elevational and partly sectional view of an additional twisting device; and FIG. 10 is an end elevational view as seen from the left-hand side of FIG. 9.

DESCRIPTION OF THE PREFERRED EMBODIMENTS

Figure 1:
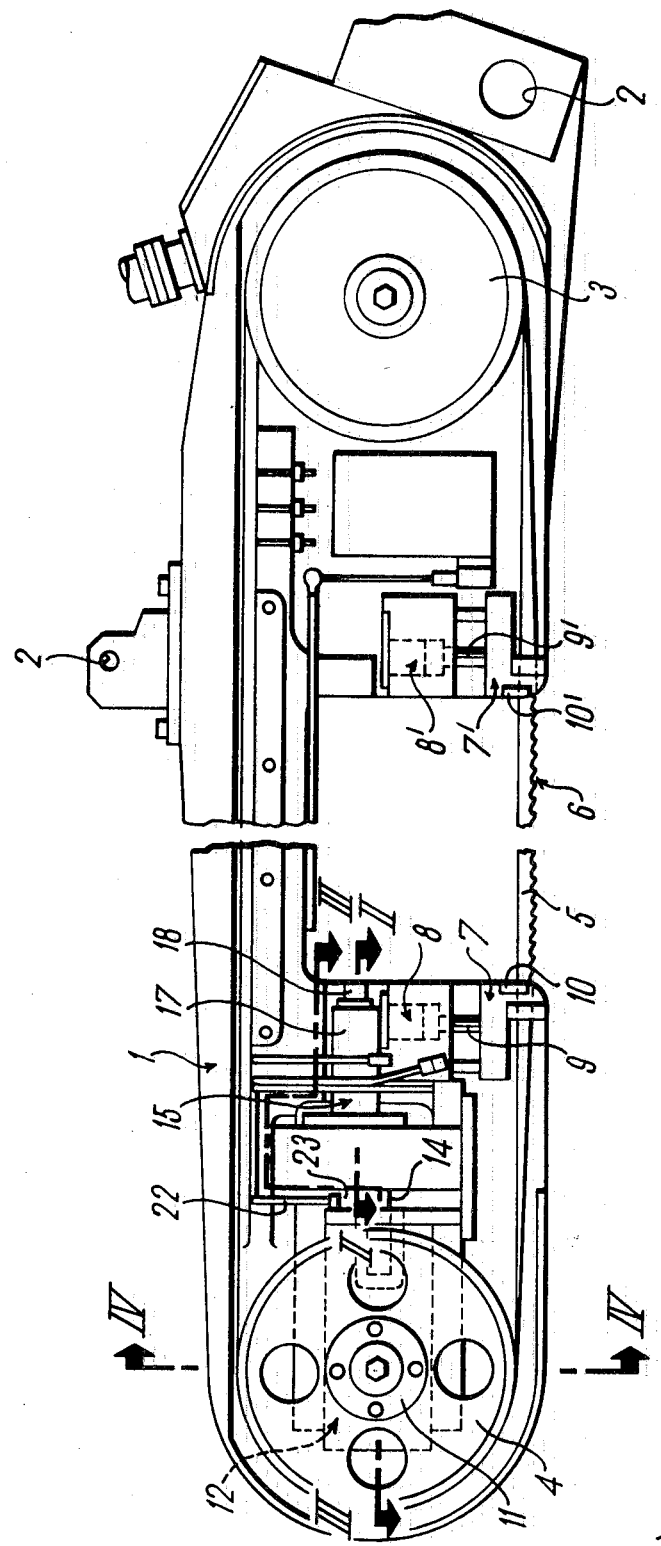
FIG. 1 is a fragmentary front elevational view of a band saw which embodies one form of the invention.

Referring first to FIGS. 1 to 4, there is shown a band saw which can be used with advantage for cutting animal caracasses, e.g., in slaughterhouses wherein carcasses are cut up seriatim at a high frequency while being transported in a production line. The band saw comprises a support or frame 1 which is provided with eyelets 2 for attachment to a suitable carrier (not shown) so as to facilitate manipulation of the band saw in the plant. Alternatively, the eyelets 2 are used to allow for rapid detachment of the support 1 from a heavier support in order to reduce the weight of that part (shown in FIG. 1) of the band saw which must be manipulated for the purpose of replacing a spent or damaged endless saw blade 5 with a fresh blade.

The support 1 carries two pulleys 3 and 4 which are rotatable about parallel axes. The pulley 3 is driven by a suitable motor, not shown, and the two pulleys are disposed in a common plane so that the endless blade 5 can be readily trained therearound. The support 1 is constructed in such a way that it leaves unobstructed an elongated stretch or reach 6 of the blade 5 between the pulleys 3 and 4 so that such reach can be used for cutting of carcasses or the like. In order to enable the reach 6 to penetrate into a carcass, it is necessary to twist a portion of such reach between the pulleys 3 and 4 through an angle of substantially 90° so that the twisted central portion of the reach 6 is located in a plane making an angle of 90 degrees with the axes of the pulleys 3 and 4. As can be seen in the lower portion of FIG. 1, the teeth on the twisted portion of the reach 6 face outwardly (downwardly) and away from the main portion of the support 1.

The means for twisting the central portion of the reach 6 into the aforementioned plane includes two discrete twisting units 7, 7' which are carried by the support 1 and are movable relative thereto into and from engagement with the reach 6. The twisting units 7 and 7' are spaced apart from one another, as considered in the longitudinal direction of the reach 6, and that portion of the reach 6 which is disposed between the twisting units 7, 7' is used for cutting.

The displacing means for moving the twisting units 7, 7' relative to the support 1 comprises two fluid-operated motors having double-acting cylinders 8, 8' secured to the support 1 and reciprocable pistons rods 9, 9' which carry the respective twisting units 7, 7'. Each of the twisting units 7, 7' comprises a slotted jaw or claw or two discrete jaws or claws 10, 10' which can receive the adjacent portion of the reach 6 therebetween. Those portions of the jaws or claws 10, 10' which are in actual contact with the reach 6 of the blade 5 are hardened or otherwise rendered more resistant to wear so as to ensure uninterrupted use for long periods of time. For example, the jaws or claws 10, 10' can be made of a suitable hard metallic material or of a surface-hardened metallic material. It is also possible to provide each of the jaws or claws 10, 10' with sets of idler rollers which come into actual contact with the twisted portion of the reach 6. This further reduces the likelihood of pronounced wear because the rollers are set in motion as soon as the driven pulley 3 begins to rotate so as to move the blade 5 along an endless path.

The piston rods 9, 9' can be moved to and from the illustrated extended positions in which the twisting units 7, 7' engage the reach 6 and twist the engaged portions of such reach so that the entire portion of the blade 5 between the twisting units 7, 7' is disposed in a plane which is parallel to the plane of FIG. 1 and normal to the axes of the pulleys 3 and 4. If the blade 5 is to be detached from the pulleys 3 and 4, the cylinders 8, 8' are actuated to retract the respective piston rods 9, 9' whereby the piston rods retract the respective jaws or claws 10, 10' to thus separate or disengage the twisting units 7, 7' from the reach 6. The twisting units 7, 7' remain in the retracted positions until after the blade 5 is replaced with a fresh blade.

As can be seen in FIGS. 3 and 4, the pulley 4 is rotatably mounted on a stub shaft 11 which is fixedly installed in a carriage 12. The latter is reciprocable in or on the support 1 in directions at right angles to the axis of and away from and toward the pulley 3 to thereby tension or relax the tensional stress upon the band saw blade 5.

The means for tensioning the blade 5 comprises a first biasing device including a resilient element in the form of a coil spring 13 which is arranged to urge the carriage 12 (and hence the pulley 4) in a direction away from the pulley 3. To this end, the spring 13 reacts (indirectly) against the support 1 and bears (indirectly) against the carriage 12. The bias of the spring 13 is not very pronounced (e.g., it may be in the range of 2.5 kp) so that it can be readily overcome by hand in order to allow for rapid, effortless and convenient removal of a blade 5 and for training of a fresh blade around the pulleys 3 and 4. A spring 13 which exerts upon the carriage 12 a force in the range of up to 5 kp is also acceptable because such force can be readily overcome by the operator. The right-hand convolution of the spring 13 (as viewed in FIG. 3) bears against a portion 14 of a block-shaped member 15 which is mounted on or forms part of the support 1, and the other end convolution of the spring 13 bears or can bear against a suitable socket 12a on the carriage 12.

The means for tensioning the blade 5 further comprises a second biasing device which includes the block-shaped member 15 and a resilient means in the form of a package of dished springs 16. The block-shaped member 15 can be said to constitute a portion of a composite housing 17 for the springs 16 and for an operating unit 115 serving to increase or reduce the bias of the springs 16 upon the carriage 12 so as to enable an operator to replace a blade 5 with a fresh blade with a minimum of effort normally not exceeding that which is necessary to overcome the bias of the coil spring 13 of the first biasing device. The springs 16 are installed in the housing 17 and they react against a screw 18 which constitutes an adjusting means for varying the bias of the springs 16 independently of the operating unit 115 and meshes with the right-hand end portion of the housing 17, as viewed in FIG. 1 or 2. The springs 16 can be said to be installed in series with the operating unit 115 so that one of the parts including the springs 16 and the unit 115 reacts against the support 1 and the other of these parts bears against the carriage 12 in order to urge the pulley 4 away from the pulley 3.

The operating unit 115 comprises a piston 19 which is reciprocable in a fixedly mounted cylinder 119 forming part of the housing 17 and defining a plenum chamber 20 at one side of the piston 19. The leftmost dished spring 16 of FIG. 2 is in contact with that side of the piston 19 which faces away from the plenum chamber 20. The latter can receive a pressurized fluid medium (e.g., compressed air) by way of a conduit 22 from a suitable source, not shown, when the valve means in the conduit 22 allows for admission of pressurized fluid into the cylinder 119. The piston 19 is then moved to the right-hand end position of FIG. 2 and causes the springs 16 to store additional energy. At the same time, a piston rod 23 of the piston 19 (such piston rod extends through the chamber 20 and through and beyond the left-hand end wall of the cylinder 119) is retracted in a direction toward the pulley 3 so that it ceases to bear against the carriage 12 which then allows the pulley 4 to move toward the pulley 3 as soon as the person in charge overcomes the bias of the spring 13. The piston rod 23 is in permanent contact with the carriage 12 or it engages the carriage not later than when the plenum chamber 20 is connected with the atmosphere or with a sump (depending on the nature of pressurized fluid) so that the springs 16 can expand and bias the piston rod 23 against the carriage 12 with a force which is many times the force of the spring 13.

In order to ensure accurate guidance of the piston 19 in the cylinder 119, the piston is connected with a coaxial guide rod 21 which extends through the axial passage of the package of dished springs 16 and is reciprocable in an axial bore of the externally threaded adjusting screw 18. The provision of the guide rod 21 is desirable and advantageous when the piston 19 is relatively thin so that it is likely to tilt in the cylinder 119 in the absence of any guide means. The force with which the springs 16 urge the piston rod 23 against the carriage 12 when the cylinder chamber 20 is free to communicate with the atmosphere or with the sump can be in the range of between 500 and 600 kp.

The likelihood of tilting or other undesirable changes of orientation of the tensioning means for the blade 5 relative to the support 1 can be reduced still further by placing the tensioning means into the general plane of the pulleys 3, 4 and substantially midway between the reach 6 and the other elongated reach of the blade 5.

When the band saw is to receive a fresh blade 5, the conduit 22 admits a pressurized hydraulic or pneumatic fluid into the chamber 20 so that the piston 19 of the operating means 115 is moved to the end position of FIG. 2 whereby the piston rod 23 is disengaged from or greatly relaxes the stress upon the carriage 12 so that the latter is biased primarily or exclusively by the relatively weak coil spring 13 of the first biasing device. In the next step, the piston rods 9 and 9' are retracted so that the twisting devices 7 and 7' are disengaged from the elongated reach 6 of the blade 5. The operator is then in a position to overcome the bias of the spring 13 by moving the carriage 12 in a direction toward the pulley 3 so that the previously used blade 5 can be readily slipped off the peripheral surfaces of the pulleys 3, 4 and can be just as readily replaced with a fresh blade 5.

When a fresh blade 5 is properly trained over the pulleys 3 and 4, the operator allows the spring 13 to expand and to urge the pulley 4 away from the pulley 3 so that the freshly applied blade 5 is under slight tension. For example, the spring 13 can (indirectly) act upon the freshly installed blade 5 with a force in the range of approximately 5 kp. In the next step, the cylinders 8, 8' are actuated to move the respective piston rods 9, 9' to their extended positions after the stretch 6 of the freshly applied blade 5 has been twisted by hand so that it fits into the slots of the twisting units 7, 7'. This moves the twisting units 7 and 7' to the operative positions of FIG. 1 and all that remains is to increase the bias upon the freshly installed blade 5 so that the latter is subjected to a tensional stress which is necessary or desirable in actual use of the band saw. This is achieved by permitting the pressurized hydraulic or pneumatic fluid to escape from the chamber 20 of the operating means 115 whereby the package of dished springs 16 is free to expand and to urge the piston rod 23 of the piston 19 against the carriage 12 with a force of between, for example, 500 and 600 kp.

The band saw is preferably provided with a control unit 100 which is shown schematically in FIG. 4a and is designed to actuate the cylinders 8, 8' of the displacing means for the twisting units 7, 7' so that these units are moved to their retracted positions through a suitable time-delay unit 101 after the operating means 115 has been actuated so that the bias of the springs 16 upon the carriage 12 is reduced to zero. The cylinders 8, 8' of the displacing means are actuated upon completed training of a fresh blade 5 over pulleys 3, 4 and the operating means 115 is actuated thereafter through the medium of a time-delay unit 102 so that the freshly installed blade 5 is tensioned by the springs 16 in response to evacuation of pressurized fluid from the chamber 20. This completes the replacement of a spent or damaged blade 5 with a fresh blade. Thus, the bias of the springs 16 is relaxed prior to retraction of the twisting units 7, 7' preparatory to removal of a worn or damaged blade 5, and the twisting units 7, 7' are caused to engage a freshly applied blade 5 before the operating means 115 is actuated again to allow for expansion of the springs 16 and the application of full bias to the carriage 12 for the reciprocable pulley 4.

The piston rods 9, 9' of the displacing means for the twisting units 7, 7' of FIG. 1 are reciprocable at right angles to the longitudinal direction of the reach 6 of the blade 5.

FIGS. 5 and 6 show one (107) of two modified twisting units which can be used in lieu of the twisting units 7 and 7'. The unit 107 comprises a chuck 24 which is a slotted tubular element serving to receive a portion of the reach 6 and being rotatable about its axis which is parallel to the longitudinal direction of the reach 6. The displacing means comprises a cylinder 8 for a piston 8a having a piston rod 9 which is reciprocable at right angles to the longitudinal direction of the reach 6 and is articulately connected with a torque transmitting tube 25 which surrounds and rotates the chuck 24. The articulate connection comprises an arm 26 which extends radially of the torque transmitting tube 25 and a link 27 which connects the arm 26 with the exposed end portion of the piston rod 9. The tube 25 is rotatably mounted in the support 1 which is not shown in FIGS. 5 and 6. The arrow 28 denotes the directions of angular movement of the tube 25 and chuck 24 in response to reciprocation of the piston 8a in the cylinder 8. The latter is a double-acting cylinder whose chambers can receive pressurized fluid from a suitable source through the medium of valves which are not specifically shown and which can be actuated in response to signals from a control unit corresponding to the control unit 100 of FIG. 4a. The piston rod 9 is arranged to turn the torque transmitting tube 25 and the chuck 24 through angles of 90° so that a portion of the reach 6 can be moved into and from a plane which makes an angle of 90 degrees with the axes of the pulleys (not shown) for the endless band saw blade 5. The tube 25 has a slot which registers with the slot of the chuck 24 so as to allow for convenient insertion and extraction of a portion of the reach 6. The band saw which embodies twisting units of the type shown in FIGS. 5 and 6 is preferably provided with means for overlapping the open outer ends of the registering slots in the tube 25 and chuck 24 so as to prevent accidental expulsion of the reach 6 from such slots and potential injury to a person standing by when the band saw is in actual use. For example, the reach 6 of the band saw blade 5 could escape by way of the open ends of the slots in the tube 25 and chuck 24 in response to breakage of the blade 5.

FIGS. 7 and 8 illustrate a twisting unit 207 which constitutes a first modification of the twisting unit 107 of FIGS. 5 and 6. The axis of the piston rod 9 extends at right angles to the longitudinal direction of the reach 6 (the same as in FIG. 1) and the outer end portion of the piston rod 9 is again connected to an arm 26 by a link 27. The arm 26 forms an integral or separable part of a slotted chuck 10a for a portion of the reach 6. When the piston 8a is held in the position of FIG. 8, a portion of the reach 6 is twisted through an angle of 90° so that this reach is ready to sever a carcass or the like. When the piston 8a is moved to its extended position (in a direction to the right, as viewed in FIG. 8), the reach 6 is untwisted and can be readily withdrawn from the slot of the chuck 10a. The arrow 28 indicates the directions of pivotal movement of the link 27 in response to reciprocation of the piston rod 9. A movement of the piston 8a to its extended position preferably results in automatic disengagement of the chuck 10a from the reach 6 of the blade 5. This simplifies the task of the person in charge of replacing the illustrated blade 5 with a fresh blade.

FIGS. 9 and 10 illustrate a twisting unit 307 including a chuck 10b which is analogous to or identical with the chuck 10a of FIGS. 7, 8 but is pivotable about an axis which is normal to the longitudinal direction of the reach 6 into and from engagement with a portion of such reach. The displacing means for the chuck 10b comprises a fluid-operated motor whose piston rod 9 is parallel to the longitudinal direction of the reach 6 and which can pivot the chuck 10b through the medium of a link 27 and an arm 26 which latter is rigid with the chuck 10b.

In each of FIGS. 5 to 10, a portion of the reach 6 of the blade 5 is shown in the operative (twisted) position.

An important advantage of the improved band saw is that the tensioning of the blade 5 can be effected in several stages and in such a way that, when the bias of the biasing device including the springs 16 is reduced (preferably to zero), the operator can readily overcome the bias of the remaining biasing device (including the spring 13 or other suitable resilient means) so as to allow for rapid detachment of a blade 5 and for insertion of a fresh blade with a minimum of effort, without endangering his or her hands and within a surprisingly short interval of time. The spring 13 offers relatively little resistance to movement of the carriage 12 toward the pulley 3 so that the operator can readily maintain the pulley 4 in a position in which a previously used blade 5 can be conveniently slipped off the pulleys 3 and 4 to be replaced with a fresh blade. The spring 13 is then permitted to expand and to hold the freshly installed blade 5 in tensioned condition so that the blade cannot accidentally slip relative to the pulleys 3, 4 while the pulley 4 is moved away from the pulley 3 in response to evacuation of pressurized fluid from the chamber 20 of the operating means 115 for the biasing device including the package of dished springs 16. Moreover, the operator can manually twist the reach 6 of a freshly installed blade 5 so that two spaced-apart portions of such reach fit into the slots of the twisting units 7, 7' of FIG. 1 before the control unit 100 permits pressurized fluid to escape from the chamber 20, i.e., before the tensioning of the freshly installed blade 5 is completed. Such mode of installing a fresh blade 5 is highly unlikely to result in damage to the fresh blade and/or in injury to the operator.

Another important advantage of the improved band saw is that the chamber 20 need not be filled with a pressurized fluid when the implement is in actual use. In other words, the chamber 20 is evacuated when the biasing device including the springs 16 is activated to urge the piston rod 23 against the carriage 12 and to thus maintain the blade 5 under requisite tension. This is desirable because the operation is more reliable since the bias of the springs 16 does not change when the chamber 20 is evacuated. If the band saw were designed in such a way that the springs 16 would apply a requisite force against the carriage 12 in response to introduction of a pressurized fluid into the chamber 20, any leakage of such fluid from the chamber 20 in actual use of the band saw would entail a reduction of tensional stress upon the blade 5 and potential damage to the implement and injury to the persons standing nearby. While it is possible to utilize resilient means other than a package of dished springs, such types of springs are preferred at this time because they can apply a very pronounced force and occupy little room. The utilization of operating means 115 which includes a single-acting cylinder 119 and wherein the springs 16 act directly against one side of a flat piston 19 also contributes to compactness of the main biasing device for the blade 5 and of the operating means for activating or deactivating such main biasing device. The construction of the biasing device including the springs 16 and of the operating means 115 therefor can be simplified if the left-hand end portion of the guide rod 21 (as viewed in FIG. 2) constitutes the piston rod which acts upon the carriage 12 when the springs 16 are free to expand, i.e., in response to evacuation of pressurized fluid from the chamber 20. When the valve means in the conduit 22 admits a pressurized fluid into the chamber 20 to shorten the package of springs 16, these springs store additional energy but without any adverse effect upon the blade 5 because such bias is taken up by the piston 19 (whose rod 23 is then disengaged from the carriage 12 or merely contacts the carriage) and by the housing 17 which is affixed to the support 1.

The provision of displacing means for the twisting units also contributes to simplicity of manipulation of the band saw for the purpose of removing or inserting a blade 5. This holds true irrespective of the exact construction of the displacing means, i.e., irrespective of whether the twisting units are reciprocable or pivotable relative to the reach 6 of the blade 5 and irrespective of whether the displacing means include piston rods which are movable in parallelism with or at right angles to the reach 6. As explained above, the twisting operation can take place automatically if the control unit 100 or an analogous control unit is designed to actuate the displacing means and the operating means in a given sequence in order to allow for detachment of a blade from the pulleys or to twist and thereupon fully tension a freshly installed blade. As also mentioned above, a portion of the reach 6 of a freshly installed blade 5 can be twisted shortly prior to the application of the final tensional stress, and the tensional stress which is applied by the springs 16 is reduced to zero shortly before the twisting units are disengaged from the reach 6 preparatory to removal of a blade 5 from the improved implement. Automatic sequencing of such operations further reduces the length of intervals which are required for removal of a blade from or for insertion of a blade into the band saw. The operator then merely removes a blade when the tensional stress is minimal (such minimal stress is applied by the spring 13) and the operator inserts a fresh blade by overcoming the minimal or small bias of the spring 13. Threading of selected portions of the reach 6 into the twisting units also takes up very little time so that the entire operation involving the removal of a blade and the installation of a fresh blade can be completed within a fraction of the time which is required in heretofore known band saws. The exact construction of the control unit 100 or an analogous control unit which can be used in or in conjunction with the improved band saw forms no part of the present invention. Such control unit can comprise suitable limit switches, proximity detectors and/or other conventional electrical or electronic components which render it possible to carry out a series of steps only in a desired optimum sequence and in such a way that the blade 5 is not likely to be damaged and that the operator is not likely to sustain an injury. Mechanical sensors can be used in lieu of or in conjunction with electrical or electronic components.

Each of the four illustrated types of twisting units exhibits its own advantages. The unit 107 of FIGS. 5 and 6 is preferred at this time in view of its simplicity and reliability. Thus, all that is necessary is to turn the chuck 24 to a first angular position for convenient insertion of a portion of the reach 6 into its slot and to thereupon turn the chuck 24 through 90° in order to twist the corresponding portion of the reach 6 into a plane which is normal to the axes of the pulleys 3 and 4. When the chuck 24 is pivoted to the operative position of FIGS. 5 and 6, it shields a selected portion of the reach 6 from contamination by solid particulate and/or liquid material in the surrounding area.

It is also possible to provide twisting units wherein each of the chucks comprises two jaws or claws which are pivotable relative to each other into and from engagement with a portion of the blade 5 therebetween and which are thereupon pivotable as a unit to twist or untwist the blade. For example, the chuck 10a of FIGS. 7 and 8 can comprise two jaws at least one of which is movable relative to the other jaw into and from engagement with a portion of the reach 6, and the two jaws can be pivoted as a unit to twist or untwist the corresponding portion of the blade. Such jaws can be said to constitute component parts of tongs or pliers which can open and close in order to release or engage a portion of the blade and which can also turn about a selected axis (e.g., about an axis which is parallel to the longitudinal direction of the reach 6) in order to twist or untwist the blade. The just described tongs can also be constructed and assembled in such a way that the opening of the jaws automatically entails an untwisting and closing of the jaws automatically entails a twisting of a portion of the reach 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A band saw, particularly for cutting carcasses, comprising a support; a plurality of pulleys carried by said support and rotatable about parallel axes; an endless flexible saw blade trained over said pulleys, at least one of said pulleys being movable relative to another of said pulleys so as to tension or relax the tensional stress upon said blade; and means for tensioning said blade, including first biasing means activatable to react against said support and to act upon said one pulley with a first force, and second biasing means activatable to react against said support and to act upon said one pulley with a second force greater than said first force.

2. The band saw of claim 1, wherein at least one of said biasing means comprises at least one spring.

3. The band saw of claim 1, further comprising operating means for selectively activating and deactivating at least one of said biasing means so as to facilitate the training of said blade around and its removal from said pulleys in deactivated condition of said one biasing means.

4. The band saw of claim 3, wherein said one biasing means is said second biasing means.

5. The band saw of claim 3, wherein said operating means comprises a fluid-operated motor disposed in series with said one biasing means between said support and said one pulley and having a member movable between first and second positions to thereby respectively activate and deactivate said one biasing means.

6. The band saw of claim 5, wherein said one biasing means includes at least one resilient element which is arranged to store energy in response to movement of said member from one of said positions to the other of said positions.

7. The band saw of claim 3, wherein said one biasing means comprises at least one resilient element; and further comprising adjusting means for varying the bias of said resilient element independently of said operating means.

8. The band saw of claim 3, wherein said first biasing means is arranged to act upon said one pulley with a force of approximately 2.5 kp and said second biasing means is arranged to act upon said one pulley with a force of between approximately 250 and 300 kp.

9. The band saw of claim 3, wherein said one biasing means comprises at least one package of dished springs.

10. The band saw of claim 3, wherein said one operating means comprises a fluid-operated motor including a cylinder defining a plenum chamber, and a piston reciprocable in said cylinder and being adjacent to said chamber, said one biasing means including resilient means abutting against said piston opposite said chamber.

11. The band saw of claim 10, wherein said motor further comprises a piston rod reciprocable with said piston, extending through said chamber and from said cylinder, and arranged to urge said one pulley in a direction away from said other pulley in response to the bias of said resilient means against said piston.

12. The band saw of claim 10, further comprising guide means for said piston.

13. The band saw of claim 12, wherein said guide means comprises a rod affixed to said piston and extending therefrom in a direction away from said chamber.

14. The band saw of claim 13, further comprising adjusting means for varying the bias of said resilient means independently of said piston, said rod being reciprocable in said adjusting means.

15. The band saw of claim 3, further comprising a common housing for said operating means and said one biasing means, and means for separably securing said housing to said support.

16. The band saw of claim 3, wherein said blade includes an elongated reach extending between said pulleys; and further comprising means for twisting a portion of said reach through, and holding said portion at, a predetermined angle, said twisting means being carried by said support.

17. The band saw of claim 16, further comprising displacing means actuatable to move said twisting means relative to said support into and from engagement with said blade.

18. The band saw oc claim 17, wherein said displacing means comprises fluid-operated motor means.

19. A band saw, particularly for cutting carcasses, comprising a support; a plurality of pulleys carried by said support and rotatable about parallel axes; an endless flexible saw blade trained over, and having an elongated reach extending between, said pulleys, at least one of said pulleys being movable relative to another of said pulleys so as to tension or relax the tensional stress upon said blade; means for tensioning said blade, including first biasing means activatable to react against said support and to act upon said one pulley with a first force, and second biasing means activatable to react against said support and to act upon said one pulley with a second force greater than said first force; operating means for selectively activating and deactivating at least one of said biasing means so as to facilitate the training of said blade around and its removal from said pulleys in deactivated condition of said one biasing means; means for twisting a portion of said reach through a predetermined angle, said twisting means being carried by said support; displacing means actuatable to move said twisiting means relative to said support into and from engagement with said blade; and control means for deacivating said one biasing means via said operating means, for thereupon activating said displacing means with a predetermined delay to disengage said twisting means from said blade, for actuating said displacing means so as to engage said twisting means with said blade, and for thereupon activating said one biasing means via said operating means with a predetermined delay following actuation of said displacing means.

20. The band saw of claim 16, wherein said twisting means includes means for twisting said portion of said reach into a plane which is at least substantially normal to the axes of said pulleys.

21. The band saw of claim 20, wherein said twisting means includes a chuck for said portion of said reach, and means for turning said chuck through an angle of approximately 90°.

22. The band saw of claim 21, wherein said chuck comprises a slotted tubular element.

23. The band saw of claim 22, wherein said turning means is arranged to turn said chuck about an axis which is parallel to said reach.

24. The band saw of claim 21, wherein said turning means comprises means for pivoting said chuck about an axis which is normal to said reach.

25. The band saw of claim 21, wherein said chuck comprises an arm, and said turning means includes a reciprocable member, and link means articulately connecting said reciprocable member with said arm.

26. The band saw of claim 16, further comprising displacing means for said twisting means, said displacing means including a piston rod reciprocable at right angles to said reach.

27. A band saw, particularly for cutting carcasses, comprising a support; a plurality of pulleys carried by said support and rotatable about parallel axes; an endless flexible saw blade trained over, and having an elongated reach extending between, said pulleys, at least one of said pulleys being movable relative to another of said pulleys so as to tension or relax the tensional stress upon said blade; means for tensioning said blade, including first biasing means activatable to react against said support and to act upon said one pulley with a first force, and second biasing means activatable to react against said support and to act upon said one pulley with a second force greater than said first force; operating means for selectively activating and deactivating at least one of said biasing means so as to facilitate the training of said blade around and its removal from said pulleys in deactivated condition of said one biasing means; and means for twisting a portion of said reach through a predetermined angle, said twisting means being carried by said support, and said twisting means including tongs having a pair of jaws at least one of which is movable relative to the other jaw to thereby engage or become disengaged from a portion of the reach therebetween.

28. The band saw of claim 27, wherein said jaws have mating teeth.

29. The band saw of claim 16, wherein said twisting means comprises two twisting units which are spaced apart from one another, as considered in the longitudinal direction of said reach.

30. The band of claim 4, wherein said first biasing means is designed for manual deactivation.

* * * * *